Aug. 15, 1961    F. KÖRSTE    2,995,842
GROUND ASPIRATOR FOR INLAND AND DEEP SEA DREDGING
Filed May 14, 1957    3 Sheets-Sheet 1
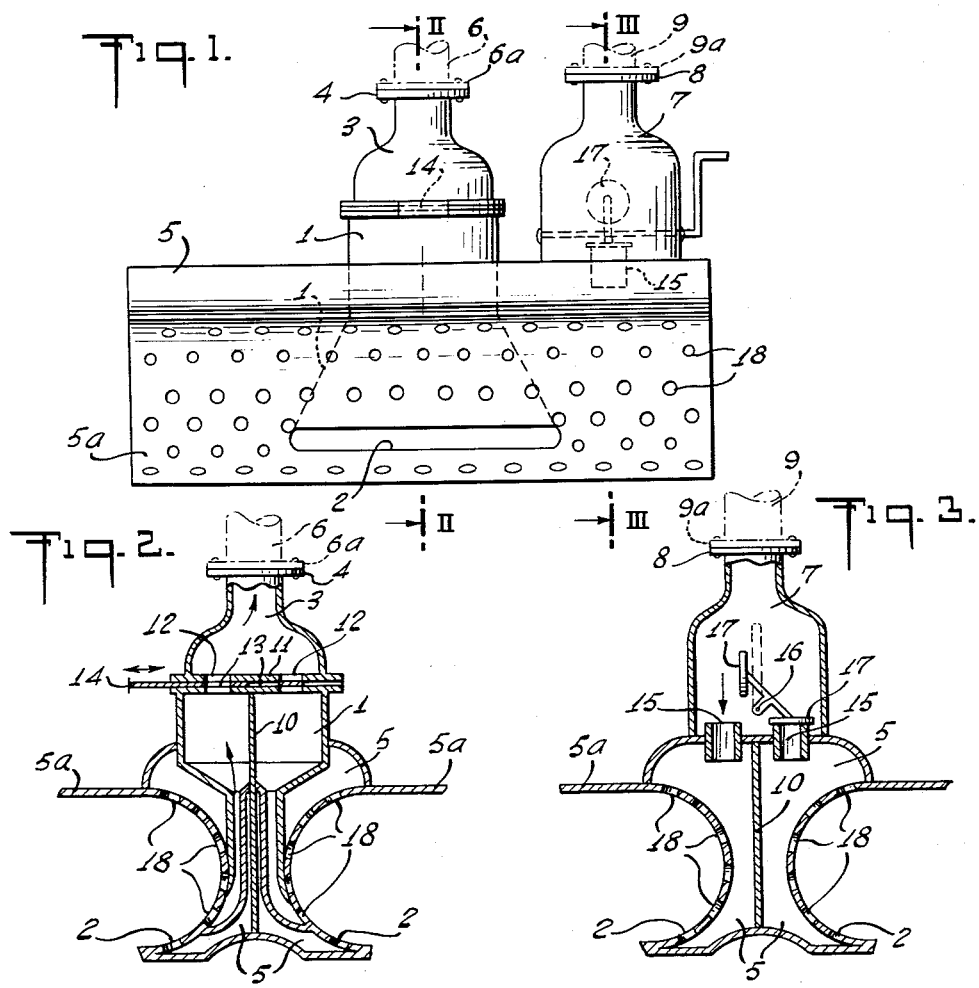
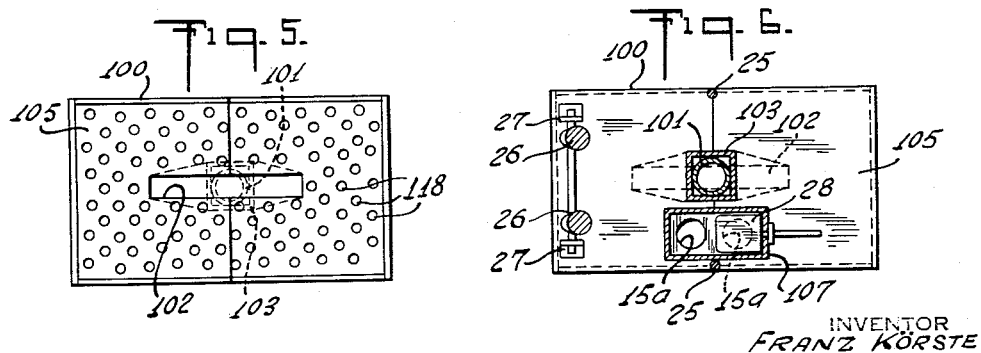
INVENTOR
FRANZ KÖRSTE

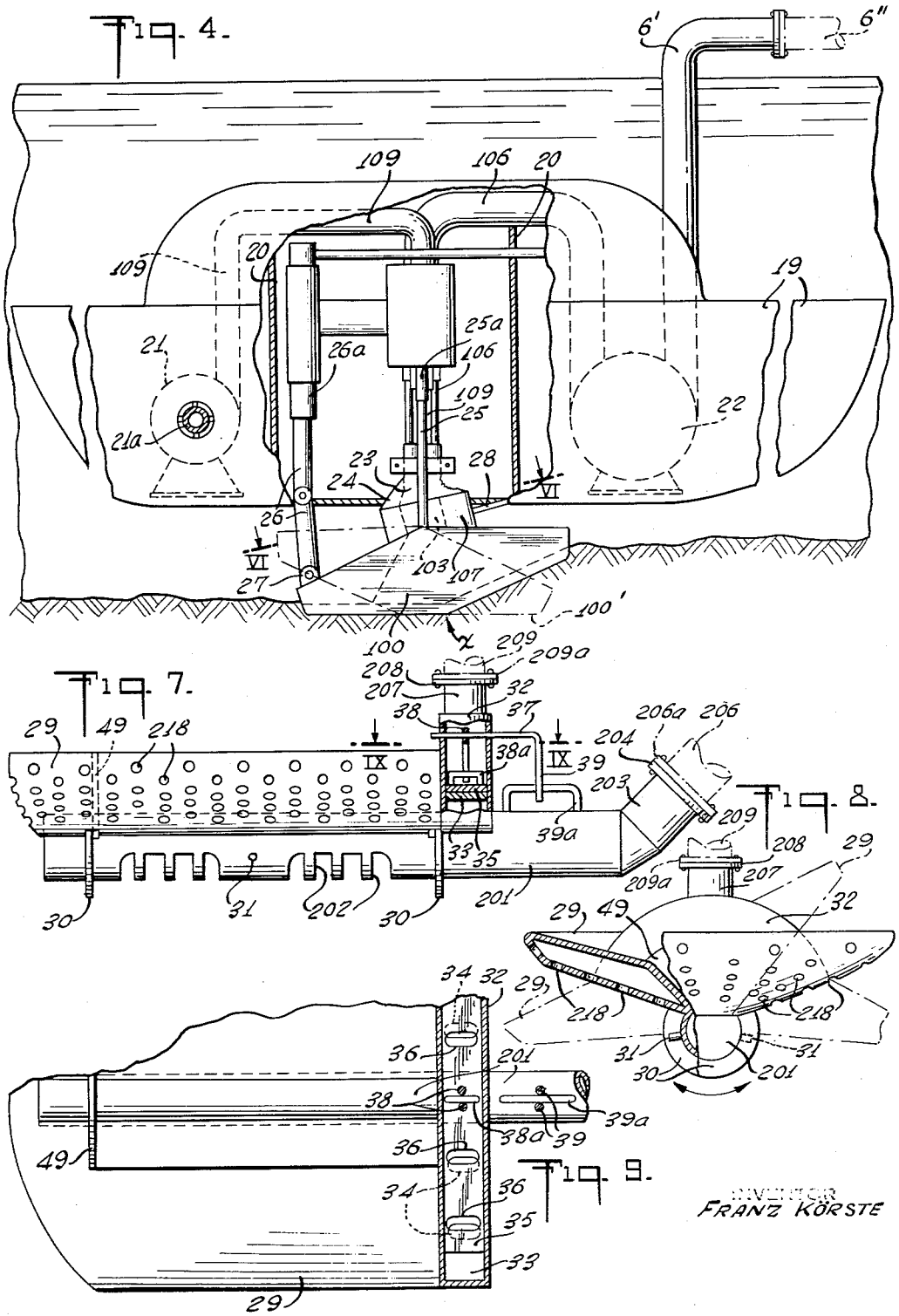

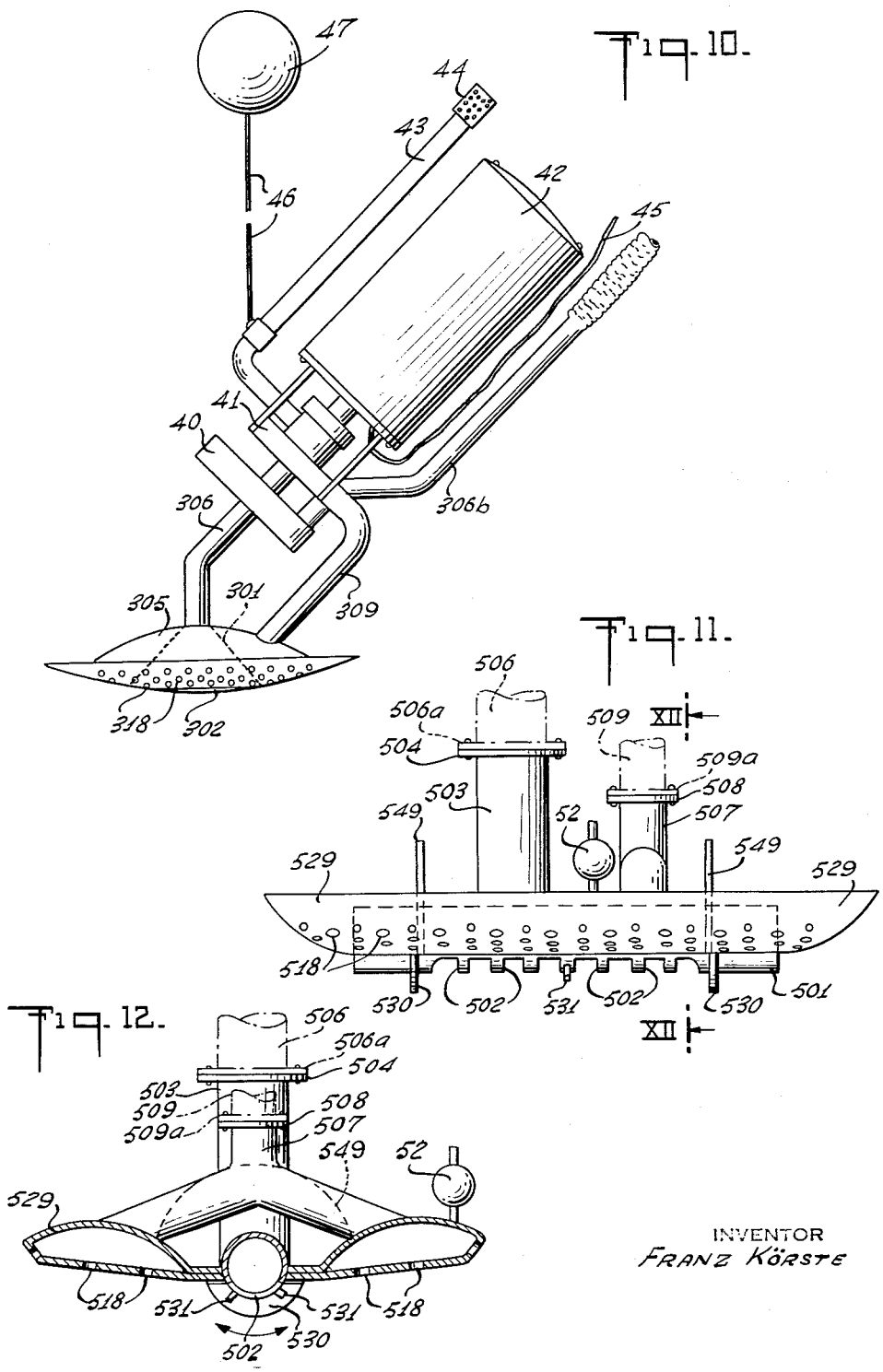

United States Patent Office 2,995,842
Patented Aug. 15, 1961

2,995,842
GROUND ASPIRATOR FOR INLAND AND
DEEP SEA DREDGING
Franz Körste, Altreetz, Kreis Bad Freienwalde (Oder),
Germany
Filed May 14, 1957, Ser. No. 659,116
13 Claims. (Cl. 37—58)

The invention relates to a large area ground aspirator for inland and deep sea dredging. Different suction flushing devices are known. However, the efficiency of the conventional systems has not proved satisfactory.

The reason for this is due to the fact that their working area is very limited. This drawback is present with all rotatably operating as well as pressure flushing ground aspirators. As a consequence thereof, only a part of the organic and inorganic substances stirred up by the pressure flushing can be seized since only part of the flow of the pressure flushing can end in the direction of the suction current whereas the diverted pressure water causes the loosened substances to swim along and be drifted off. The ground output actually obtained with such ground aspirators is, therefore, too small in relation to the entire output of the dredging pump. The maximum admissible mixture ratios and/or the output capacities of the dredging pump and the pressure conduit can by no means be reached.

Another reason for the unsatisfactory outputs of conventional ground aspirators is to be found in the fact that they frequently operate in one direction of movement only whereas they idle in the opposite direction. Furthermore, in the conventional apparatus, the flowing in of foreign water, free of ground substances, which causes a reduction in the output, is inadequately blocked. This is as equally disadvantageous as the undesirable entraining effect of each flushing jet which, hitherto unrecognized or ignored, acts like an ejector and conducts the foreign water directly to the suction conduit.

The work of suction dredges consists in most instances of the after-breaking of non-coherent ground or of staying ground (sludge, decomposed slime, etc.). The last named substances can only be conveyed in a very unfavorable mixture ratio because the hydrologically or mechanically loosened components, often reduced to colloidal sizes, will be drifted off very easily, owing to their low rates of fall, by any pressure water which is not seized by the suction current.

Furthermore, the immediate working area of the conventional apparatus on the staying grounds never exceeds the actual displacement area of the active part of the flushing head but is limited to the size of the working area, whereby the ground to be dredged will be prepared but never seized in its entirety by the suction current. Computations show that the prepared mass of the flushed distance compared with the output of the suction pumps (dredging pumps) results in an unfavorable mixture ratio between ground and working water.

This unfavorable mixture ratio becomes still worse owing to the fact that the pressure water, enriched with the flushed-up ground, will in parts not be seized by the suction current but will again be deposited close to the point from where the ground has been originally taken. Endeavors have been made to increase the working area of the flushing nozzles in the conventional apparatus. However, these attempts did not succeed because the increased distances, between the suction opening and the outer flushing jets facilitate the running-in of foreign water on account whereof the most remotely located nozzles remain ineffective.

The invention aims, therefore, to provide a high efficiency ground aspirator. The invention further aims to provide a ground aspirator which conducts the entire pressure water to the suction current and which blocks, to a large extent, the detrimental effect of the running-in of foreign water. This means that the difference in output between the dredger pump and the pressure water pump, being generally half that of the dredger pump, now constitutes the actual ground output.

In order to obtain this result, the invention further aims to provide in a ground aspirator a pressure chamber encompassing the suction opening of the suction mouth piece wherein at least portions of the walls of the pressure chamber are formed as covers or baffle-surfaces to block foreign water, and wherein the same or other wall portions of the pressure chamber are provided with pressure flushing openings. The baffles may be built without a pressure chamber for flushing vessels without pressure water.

According to the invention, the pressure flushing openings are arranged around the opening of the suction mouth piece at increasing distances.

According to another characteristic of the invention, the ground aspirator may be designed as a hand implement or as a submersible assembly intended to be towed. In that event, the ground aspirator constitutes a single unit with the power-driven suction and pressure pumps.

Another embodiment is qualified to be operated with or without pressure. This feature is obtained because the suction mouth piece, which is subject to a vacuum, is formed cylindrically and two pressure chamber fins can rotate about such mouth piece, wherein said fins are independent and spaced from each other and are, furthermore, rigidly connected at an angle to each other and designed to form baffles. The pressure chamber fins open into a valve housing connected with the pressure water conduit. The valve housing is rigidly connected with the fins and exposed to the changing position thereof. The pressure water conduit is automatically controllable from one to the other of the pressure chamber fins by means of two coupled valve-slides of the valve housing via a guide blocking the suction mouth piece.

The cylindrical suction mouth piece may also be equipped, in another embodiment, with two interconnected plates which are arranged on the upper sides at a predetermined angle with respect to each other. The bottom sides of the plates may be provided with mounds for changing the current as, for instance, with welded angular sheet metal pieces. These plates are also rotatably arranged at the suction mouth piece and their peripheries may be arched skid-like.

Further objects and details of the invention will be apparent from the description given hereinafter and the accompanying drawings showing several embodiments thereof by way of example.

In the drawing:

FIG. 1 is a side elevation of a ground aspirator for ships with cantilever or flushing tubes, FIG. 2 is a section along line II—II of FIG. 1, FIG. 3 is a section along line III—III of FIG. 1, FIG. 4 is a side elevation, partly in section, of another embodiment which is vertically shiftably arranged in a submersible boat, FIG. 5 is a bottom plan view of the ground aspirator in the direction of the arrow x in FIG. 4, FIG. 6 is a section along line VI—VI of FIG. 4, FIG. 7 is a side elevation, partly in section, of another embodiment with pressure chamber fins for a medium sized and smaller flushing ships, FIG. 8 is an end elevation, partly in section, of the ground aspirator of FIG. 7, FIG. 9 is a section along line IX—IX of FIG. 7, FIG. 10 is a side elevation of another embodiment designed as a hand implement, FIG. 11 is a side elevation of still another embodiment designed as a suction dredger for emptying barges, and
FIG. 12 is a section along XII—XII of FIG. 11.

Referring now to the drawing, FIGS. 1 to 3 show a twin ground aspirator operating in two directions and destined for use in flushing ships. A suction mouth piece 1 and a socket 3 with flange 4 is provided with a slot-like suction opening 2. The suction mouth piece 1 is surrounded by a pressure chamber 5 having external walls formed as baffles or ground-covering surfaces 5a.

The pressure chamber 5 may be differently formed, according to its type and purpose of use, and has also a socket 7 with flange 8. Flange 4 of the suction mouth piece 1 is connected to a flange 6a of a suction tube or hose 6 (indicated in dash and dot lines) of a flushing ship, not shown. The flange 8 of the pressure chamber socket 7 serves for connecting a pressure tube or hose 9 to flange 9a, also shown in dot and dash lines.

As shown in FIG. 2, the suction mouth piece 1 consists of two symmetrical parts which are separated by a partition 10. For the purpose of alternate operation, each half can be alternately connected with the socket 3 through openings 12 provided in a baffle wall 11 by means of a slide 14 or the like, which is also provided with openings 13.

As clearly shown in FIG. 3, pressure chamber 5 is also divided, by means of the partition 10, in symmetrical parts. Both pressure chamber halves are connected with the socket 7 and thus also with pressure tube 9 via valve pieces 15, which can be alternately closed by means of valve flaps 17, arranged on a common shaft 16. The slide 14 as well as the shaft 16 of the valve flaps 17 can be controlled from the flushing ship by means of control elements such as rods, not shown. The outer walls partly formed as baffles 5a of the pressure chamber 5 are provided with pressure flushing openings 18 which directly surround the slot-like suction openings 2 of the suction mouth piece 1.

Upon the starting of the operation of the pumps, the pressure flushing water (operating water) fills the pressure chamber 5. Inasmuch as the pressure flushing openings 18 of the outer walls of the pressure chamber 5 directly surrounds the slot-like suction opening 2 of the suction mouth piece 1, the entire pressure flushing water will be seized by the suction opening 2 and discharged together with the matter stirred up by that water. While this goes on, the outer walls of the pressure chamber 5 have extending from them baffles 5a, which prevent the detrimental foreign water from entering. Owing to this particular formation of the ground aspirator, an idling in one direction is avoided since, upon each swivelling to the left or to the right by the shifting of the slide 14 of the valves 17, the device is operative to full capacity.

FIG. 4 shows another embodiment of a ground aspirator 100 which is so arranged on a submersible boat that it can be hydraulically moved in the vertical direction. The submersible boat is denoted by 19. By means of partitions 20 it is divided into three compartments in the outer ones of which a pressure pump 21 and a suction pump 22 are arranged. The pressure pump 21 sucks the pressure flushing water up through the tubular conduit 21a, which is passed through the wall of the submersible boat 19. The ground aspirator 100 is disposed in the central compartment and is vertically movable by hydraulic means. The ground aspirator 100 is shown in FIG. 4 extended in operative position. The opposite working position 100' is indicated in dash and dot lines.

A suction tube 106, leading from the ground aspirator 100 to the suction pump 22, is telescopically formed in the central compartment of the submersible boat 19 and is connected with a socket 103 (FIGS. 5 and 6) of a suction mouth piece 101 by means of an elastic intermediate member 23. The parts of the tube leading upwards from the suction pump 22 are denoted by 6' and 6''. In a similar manner, a telescopically formed pressure tube 109 is connected with a socket 107 of a pressure chamber 105 by means of an elastic intermediate piece 24.

The ground aspirator can be hydraulically extended in the vertical direction by means of a piston 25 linked to the upper wall of the pressure chamber 105 and guided in cylinders 25a. The ground aspirator will be tilted into the respective operating positions by pistons 26, also linked to the wall of the pressure chamber at 27 and guided in cylinder 26a.

As clearly shown in FIG. 5, the pressure flushing openings 118 also directly surround a suction opening 102 in this embodiment. As apparent from FIG. 6, valve openings 15a are provided in the socket 107 of the pressure chamber 105 in a way similar to that shown in FIG. 3. The valve openings 15a can be alternately closed by means of a slide 28, according to the direction of operation, in the manner already described. The embodiment of the ground aspirator 100, as just described, may be used also, for instance, as a towed apparatus. In this case, the pressure and suction pumps would have to be mounted on the pressure chamber.

FIG. 7 shows an embodiment according to the invention with pressure chamber fins, as particularly suited for medium and small sized flushing ships. In this embodiment, a cylindrically formed suction mouth piece 201 is also equipped with a socket 203 with flange 204 for a flange 206a of a suction pipe 206. The mouth piece 201 is provided with a suction opening 202 and is encompassed by two pressure chamber fins 29 which are rigidly connected to each other but are separated as to their inner spaces.

These pressure chamber fins 29 fan out to form a predetermined angle and are rotatable about the cylindrical suction mouth piece 201 through an angle limited by abutments 31 which are provided at guiding bands 30 of the suction mouth piece 201, as clearly shown in FIG. 8. The pressure chamber fins 29 are provided at their lower sides with pressure flushing openings 218 which, in this manner, are also arranged directly about the suction opening 202. Both pressure chamber fins connect in the direction of the suction pipe 206 with a valve box 32 into which a socket 207 with flange 208, for a pressure tube 209, opens. The flange of the latter is denoted 209a. The valve box 32 is rigidly connected to the pressure chamber fins 29.

The box 32 is equipped with a partition 33 in which valve openings 34 are provided, as clearly shown in FIG. 9. The space underneath the partition 33 communicates with the pressure chamber fins 29. A plate 35 is longitudinally shiftable on the partition 33 and is provided also with valve openings 36 which, however, do not register with those of the partition 33. In valve box 32, a shaft 37 is journaled which carries forked lever pieces 38, 39, downwardly extending into box 32 and from the free end, respectively. The lever piece 38 of the shaft 37 pivotally clasps, in the valve box, a holder piece 38a fixed on the shiftable valve plate 35, and the lever piece 39 pivotally clasps a holder piece 39a fixed on the suction mouth piece 201. When tilted up, as shown in dash and dot lines in FIG. 8, the pressure chamber fins 29 turn about the suction mouth piece 201 and the shaft 37 makes a relative partial turn. Thereby, the fork-like lever piece 38 will be moved which clasps the holder piece 38a of the valve plate 35 in the valve box 32, and the valve plate 35 will be shifted upon each tilting of the pressure chamber fins 29.

In each instance the necessary valve apertures 34 of the partition 33 will be opened by the perforated plate 35 and in this manner the plate operates as a valve. When operating, a low pressure pump, not shown, forces water into the valve box 32. From there the water flows through those valve openings 34, 36 which are just then open in the connected pressure chamber fins 29 and gushes down through the pressure flushing openings 218 upon the ground layer, which is to be dredged. Thereby, the ground layer will be prepared and seized by the greater suction current of the pump in the direction of the suction openings 202. Numeral 49 denotes an internal staying member.

According to the invention, always that pressure chamber fin 29 is subjected to pressure which is in the direction of the movement so that, in the case illustrated in FIG. 8, the tilted-up pressure chamber fin 29 operates whereas the opposed pressure chamber fin 29 has the effect of blocking foreign water. This embodiment operates in a combined manner, i.e., it may be used with or without pressure flushing. In addition, it is also possible to produce pressure flushing by means of a vacuum pump. Thus, in the one implement three hydrological dredging effects are combined, which may be used selectively, depending on the kind of equipment of the flushing ship and of the kind of ground to be dredged by suction.

The embodiment of the invention illustrated in FIG. 10 is designed as a hand device. This device comprises also a suction mouth piece 301 with a slot-like suction opening 302 which is surrounded by pressure flushing openings 318. The device is combined with a suction pump 40 and a pressure pump 41 which are axially coupled with a motor 42. A pressure chamber 305 surrounding the suction mouth piece 301 is connected to the pressure pump 41 through a pressure tube 309. The pressure pump 41 is furthermore provided with a suction tube 43 which carries a suction basket 44 for sucking in clear water. This suction tube 43 serves simultaneously as a hand grip for the device. The suction mouth piece 301 is connected with the suction pump 40 through a suction tube 306 which communicates via that pump with a suction pipe 306b. The motor 42 of the hand device is connected through a conduit 45 with the current source (not shown) which may be provided, for instance, on the vessel.

By means of a rope 46 of about 1 meter length, the device is connected with a metal float 47 which keeps the device floating below the water surface. Thus, a submersible assembly is created which can be guided by hand. This ground aspirator, constructed as a hand implement or, as stated, as a tow device when united also with the pumps, ensures maximum safety of operation of the pumps due to the fact that all suction conduits and rotating parts are positioned under water and, consequently, the water column can never break off.

Another advantage of the hand device consists in the fact that it requires only low power to operate which can be provided by a small source disposed, for instance, in a small vessel, as already mentioned. Upon switching on the motor, clear water will be sucked through the suction basket 44 of the suction pipe 43 and forced by means of the pressure pump 41 through the pressure tube 309 into the pressure chamber 305 of the ground aspirator. The clear water leaves through the pressure flushing openings 318 and impinges on the matter to be sucked up. Inasmuch as the suction pump 40 starts to operate at the same time, the flushed matter will simultaneously be conveyed off through the suction pipe and conduit 306 and 306b, respectively. This takes place in accordance with the prevailing current conditions exteriorly of the area worked by the diver. This implement is of high efficiency for all alluvial sediments. Its cost is low and its size very small. The operation can be controlled by the diver on the bottom of the water.

The embodiment of FIG. 11 is intended to operate as a barge sucker or sucker for caissons. As apparent from FIGS. 11 and 12, this embodiment is also an aspirator having pressure chamber fins. The suction mouth piece is denoted by 501, the socket by 503, the flange by 504, and the suction opening by 502. A suction pipe 506 may be attached to the flange 504 by means of its flange 506a, in a manner similar to that described in connection with FIGS. 1–3 and 7. The pressure chamber fins 529 are provided with pressure flushing openings 518 on their lower sides and are also turnable about the suction mouth piece 501. The movement of the fins is limited by abutments 531 of guiding bands 530 on the suction mouth piece 501. At 549, staying members are shown for the cover plates.

As apparent from FIG. 12, the pressure chamber fins of this embodiment are not separated as to their inner spaces but are connected with one another by a common branch socket 507 having a flange 508. A pressure pipe 509 is connectable with its flange 509a to the flange 508. The tilting-up of the pressure chamber fins 529 is done, for instance, by a pull rope (not shown) which is connected with the device through a weight 52. This weight causes the automatic downward movement.

The ground aspirator according to the invention described hereinbefore can be used in any desired size as a supplemental implement for flushing ships and submersibles. Constructed as a hand operated device, it is very useful in salvaging work for freeing e.g. submerged ships from covering sand or slime. It can also be used in the grounding of caissons.

It will be apparent that according to the pump output of the device as shown and described, it is possible to obtain an area of operation of several square meters. It is insured that all matter such as sludge, decomposed slime and sand are seized by the pressure flushing at the highest admissible mixture ratio of 1:1 to 1:3. The utility of the device manifests itself even at a low depth of water. For this reason, the apparatus may be used as a small device in connection with ships of the smallest size for clearing ditches and the like.

With the structure according to the invention, the output of conventional ground aspirators will be exceeded several times. The higher consumption of power owing to the increase in output is merely caused by the specific weight now increased of the fluid column to be conveyed which, however, does not exceed the given output tolerance of the existing motors for dredging pumps. The relatively small increase in the power required is compensated by the smaller pressure head of the flushing pump inasmuch as the flushing pressure has already a useful effect starting at 0.4 atm. overpressure, because each pressure jet, after leaving the pressure flushing openings, practically immediately acts upon the ground to be removed so that no power consuming range has to be overcome in the jet hampering water of the effective range.

Owing to the fact that the outer walls of the pressure chamber are formed as baffles, the matter loosened by the flushing is prevented from drifting off inasmuch as the detrimental entraining effect of the flushing jet does not take place. The flushing jets leave the wall surrounding the suction mouth piece. In consequence, the flushing jets most remote from the suction opening become fully effective because each suction current flows between the ground and the baffle. It is furthermore possible to regulate the mixture ratio by increasing or throttling the quantity of the pressure water. In addition, the arrangement of a pressure chamber surrounding the suction mouth piece allows the provision of any desired number of pressure flushing openings of most effective diameters.

The ground arriving near the suction mouth piece or the baffle is always advantageously liquified. Owing thereto, the substances to be conveyed, even those which are most remote, will be immediately sucked along the water spraying baffle wall directly to the suction opening because no stray water prevails that would entrain substances which should be sucked off.

Further advantages of the various devices according to the invention consist in the separation of the working water from the foreign water as well as in the prevention of the detrimental entraining effect of a jet, and consequently in obtaining the highest admissible mixture ratio which can be controlled, whereby the high efficiency of the devices is ensured. A regulation of the mixture ratio may become necessary in the event of large granulation or cohesion of the substances to be conveyed. The mixture ratio and the capability of regulating do not change with any of the embodiments according to the invention.

It will be apparent to those skilled in the art that many alterations and modifications of the structure hereinbefore described are possible without departure from the essence and spirit of the invention which for that reason shall not be limited but by the scope of the appended claims.

What I claim is:

1. A ground aspirator for dredging comprising a hollow mouthpiece adapted to be interiorly subjected to a vacuum and forming a substantially horizontal aperture on the underside of said mouthpiece, a pressure chamber on said mouthpiece superjacent said aperture having a projection laterally extending a distance sufficient to cover an area of ground several times greater than said aperture and adapted for connection to a source of water under pressure, and a plurality of openings on the lateral and lower surfaces of said chamber for agitation of the dredging area, said projections forming a cover over the dredging area for limiting the dispersion of agitated solids into the surrounding water to the fringes of the dredging area.

2. A device as in claim 1, said pressure chamber being rigidly connected to said mouthpiece.

3. A device as in claim 1, said pressure chamber being movable in relation to said mouthpiece.

4. A device as in claim 1, further comprising a power driven suction pump connected to said mouth piece, and a power driven pressure water pump connected to said pressure chamber, said pumps and the remainder parts of said ground aspirator forming one unit.

5. A ground aspirator for inland and deep sea dredging, comprising a substantially cylindrical suction mouthpiece adapted to be interiorly subjected to a vacuum and being provided with a suction opening, and two hollow fins rigidly connected at an angle to each other but independent from each other as to their interior spaces, said connected fins being turnable about said suction mouth-piece coaxially therewith and being so arranged as to be adapted to extend above the area to be sucked off, said fins being adapted to be connected to a source of pressure water and being provided in their walls with pressure water discharge openings.

6. A device as in claim 1, further comprising hydraulic lifting and lowering means, linking means connecting said hydraulic lifting means to said mouthpiece and pressure chamber assembly, and other hydraulic means connected to said pressure chamber to tilt said assembly.

7. A ground aspirator for inland and deep sea dredging, comprising a substantially cylindrical mouthpiece adapted to be interiorly subjected to a vacuum and having at least one opening in the curved wall of said mouthpiece, and two hollow fins rigidly connected at an angle to each other but independent from each other as to their interior spaces, said fins having a plurality of openings at their bottom sides arranged at progressively increasing distances about said suction mouthpiece, said connected fins being turnable about said suction mouthpiece coaxially therewith and being so arranged as to be adapted to extend above the area to be sucked off, said fins being adapted to be connected to a source of pressure water for discharge through said plurality of openings.

8. A ground aspirator for dredging comprising a hollow horizontally extending cylindrical mouthpiece adapted to be interiorly subjected to a vacuum, a plurality of slotted apertures on the underside of said mouthpiece, a pressure chamber including a pair of hollow fins connected at an angle to each other and interiorly separated from each other, said fins being connected to said mouthpiece and extending along the longitudinal axis of said mouthpiece, said fins forming a wedge shape capable of forming an enclosure with a cavity produced in the dredging area, said chamber being adapted for connection to a source of fluid under pressure, a plurality of openings on the underside of said fins for flushing the fluid under pressure, whereby said fins form a cover over the dredging area for limiting the dispersion of agitated solids into the surrounding water to the fringes of the dredging area.

9. A ground aspirator for dredging as set forth in claim 8, said fins being fixedly secured to each other and covering an area several times the size of said apertures.

10. A ground aspirator for dredging as set forth in claim 8, wherein said pair of fins are fixedly secured to each other and pivotally mounted for movement about said mouthpiece.

11. A ground aspirator for dredging as set forth in claim 10, further comprising a pair of lugs secured to said mouthpiece for limiting the pivotal movement of said fins about said longitudinal axis of said mouthpiece.

12. A ground aspirator for inland and deep sea dredging, comprising a substantially cylindrical suction mouthpiece adapted to be interiorly subjected to a vacuum and being provided with a suction opening, two hollow fins rigidly connected at an angle to each other but independent from each other as to their interior spaces, said connected fins being turnable about said suction mouthpiece coaxially therewith and being so arranged as to extend above the area to be sucked off, said fins being adapted to be connected to a source of water under pressure and having in their walls water discharge openings, abutments on said suction mouthpiece to define two angularly spaced end positions of said fins, a valve housing rigidly connected with said fins so as to be movable with the latter, a pressure water conduit connected to said valve housing, two valving means on said housing and cooperating with said fins, respectively, to open and close the passage of water to said fins, and control means responsive to the fin movement and connected to said valving means to open the one and close the other valving means in one of said end positions of the fins and to close the one and open the other in the other of said end positions of the fins.

13. A ground aspirator for inland and deep sea dredging, comprising a suction mouthpiece for positioning near the ground, adapted to be interiorly subjected to a vacuum and having an opening at the underside thereof for drawing in a mixture of solids and liquids, pressure chamber means above and around said opening of the mouthpiece adapted to be filled with pressurized fluid, said chamber means including a lower surface about and above said opening of the mouthpiece, said surface having an area substantially larger than that of said opening and being provided with a plurality of fluid jet producing holes for agitating the solids under said surface, whereby dispersion of said solids into the surrounding water due to said agitation is prevented and limited to the outer fringes of the area covered by said surface.

References Cited in the file of this patent
UNITED STATES PATENTS

| | | |
|---|---|---|
| 63,661 | Smith | Apr. 9, 1867 |
| 95,213 | Elliott | Sept. 28, 1869 |
| 491,748 | Urie | Feb. 14, 1893 |
| 508,766 | Sackett | Nov. 14, 1893 |
| 543,637 | Bates | July 30, 1895 |
| 780,027 | Edwards et al. | Jan. 17, 1905 |
| 842,364 | White | Jan. 29, 1907 |
| 909,543 | Carlesimo | Jan. 12, 1909 |
| 1,530,654 | Daley | Mar. 24, 1925 |
| 1,964,951 | Kertzman | July 3, 1934 |
| 2,413,561 | Hehr | Dec. 31, 1946 |
| 2,599,980 | Dunning | June 10, 1952 |
| 2,605,090 | Jacobsen | July 29, 1952 |
| 2,774,569 | Jacobsen | Dec. 18, 1956 |